US011813912B1

(12) United States Patent
Ford et al.

(10) Patent No.: US 11,813,912 B1
(45) Date of Patent: Nov. 14, 2023

(54) SUSPENSION SYSTEM FOR A VEHICLE

(71) Applicant: LIQUIDSPRING TECHNOLOGIES, INC., Santa Fe Springs, CA (US)

(72) Inventors: Gary B. Ford, Santa Fe Springs, CA (US); Richard J. Meyer, Santa Fe Springs, CA (US)

(73) Assignee: LIQUIDSPRING TECHNOLOGIES, INC., Santa Fe Springs, CA (US)

( * ) Notice: Subject to any disclaimer, the term of this patent is extended or adjusted under 35 U.S.C. 154(b) by 0 days.

(21) Appl. No.: 18/306,025

(22) Filed: Apr. 24, 2023

(51) Int. Cl.
*B60G 17/016* (2006.01)
*B60G 17/0185* (2006.01)
*B60G 17/019* (2006.01)

(52) U.S. Cl.
CPC ..... *B60G 17/0162* (2013.01); *B60G 17/0185* (2013.01); *B60G 17/01908* (2013.01); *B60G 2202/413* (2013.01); *B60G 2400/61* (2013.01); *B60G 2500/302* (2013.01); *B60G 2600/08* (2013.01); *B60G 2600/182* (2013.01); *B60G 2800/012* (2013.01); *B60G 2800/014* (2013.01)

(58) Field of Classification Search
CPC ............ B60G 17/0162; B60G 17/0185; B60G 17/01908; B60G 2202/413; B60G 2400/61; B60G 2500/302; B60G 2600/08; B60G 2600/182; B60G 2800/012; B60G 2800/014

See application file for complete search history.

(56) References Cited

U.S. PATENT DOCUMENTS 3,003,784 A  10/1961  Hodkin
3,028,175 A   4/1962  Eckman
(Continued)

FOREIGN PATENT DOCUMENTS

CN  108819651 A  11/2018
EP    0984880 A1   3/2000
(Continued)

OTHER PUBLICATIONS

US 11,472,251 B1, 10/2022, Rocroi et al. (withdrawn)
(Continued)

*Primary Examiner* — Mussa A Shaawat
(74) *Attorney, Agent, or Firm* — Lewis Roca Rothgerber Christie LLP

(57) ABSTRACT

A closed leveling system for a vehicle includes a suspension system having a number of corners, and each corner includes at least one strut to be coupled to at least one wheel of the vehicle. The closed leveling system also includes a sensor and a master controller in communication with the sensor. The master controller includes a memory device including computer-readable instructions, and a processor in communication with the memory device. The leveling system also includes a power module assembly including a reservoir containing compressible liquid, a pump configured to withdraw the compressible liquid from the reservoir, a dump valve configured to transfer the compressible liquid into the reservoir, and isolation valves. Each isolation valve is associated with at least one corner. The leveling system further includes secondary volumes in selective fluid communication with the reservoir. Each secondary volume is associated with one isolation valve and at least one corner.

30 Claims, 3 Drawing Sheets

(56) References Cited

U.S. PATENT DOCUMENTS

| | | | | |
|---|---|---|---|---|
| 3,917,307 | A | * | 11/1975 | Shoebridge ............ B60G 21/06 280/6.159 |
| 4,597,584 | A | | 7/1986 | Hanser |
| 4,746,133 | A | | 5/1988 | Hanser et al. |
| 5,071,159 | A | | 12/1991 | Kamimura et al. |
| 5,097,419 | A | * | 3/1992 | Lizell ................ B60G 17/018 188/266.5 |
| 5,143,386 | A | | 9/1992 | Uriarte |
| 5,163,659 | A | * | 11/1992 | Lizell ............... B60G 17/0152 267/64.16 |
| 5,291,406 | A | * | 3/1994 | Williams ........... B60G 17/0272 701/37 |
| 5,316,272 | A | * | 5/1994 | Davis .................... B60G 17/04 188/266.5 |
| 6,293,530 | B1 | * | 9/2001 | Delorenzis ............... F16F 5/00 267/64.13 |
| 6,416,061 | B1 | * | 7/2002 | French .................... F16F 9/36 280/124.159 |
| 6,619,693 | B1 | | 9/2003 | Sproatt et al. |
| 6,679,504 | B2 | | 1/2004 | Delorenzis et al. |
| 7,891,673 | B2 | | 2/2011 | Delorenzis et al. |
| 2002/0035423 | A1 | * | 3/2002 | Shank ............. B60G 17/01933 280/5.514 |
| 2003/0075882 | A1 | * | 4/2003 | Delorenzis .......... B60G 17/056 280/5.508 |
| 2003/0236603 | A1 | | 12/2003 | Lu |
| 2004/0049330 | A1 | | 3/2004 | Fiorletta et al. |
| 2004/0061293 | A1 | | 4/2004 | Barbison |
| 2004/0094913 | A1 | * | 5/2004 | Flynn ...................... G01C 9/12 280/6.153 |
| 2004/0178587 | A1 | | 9/2004 | Hiebert et al. |
| 2004/0260442 | A1 | | 12/2004 | Holbrook et al. |
| 2005/0080543 | A1 | | 4/2005 | Lu et al. |
| 2005/0161891 | A1 | * | 7/2005 | Trudeau ............... B60G 17/018 280/6.155 |
| 2013/0090808 | A1 | | 4/2013 | Lemme et al. |
| 2013/0110389 | A1 | * | 5/2013 | Solbrack ............ B60G 17/0162 701/124 |
| 2014/0219756 | A1 | | 8/2014 | Smith et al. |
| 2015/0168953 | A1 | | 6/2015 | Smid |
| 2015/0251515 | A1 | | 9/2015 | Joachim et al. |
| 2016/0161944 | A1 | | 6/2016 | Leonard |
| 2018/0127249 | A1 | | 5/2018 | Collin et al. |
| 2018/0178763 | A1 | | 6/2018 | Fong |
| 2020/0355498 | A1 | | 11/2020 | Manfreda |
| 2023/0086480 | A1 | * | 3/2023 | Tan .................... B60G 17/0165 701/37 |
| 2023/0088419 | A1 | * | 3/2023 | Johnson ................. B60P 1/162 280/5.514 |
| 2023/0115190 | A1 | * | 4/2023 | Boon ................. B60G 17/0164 141/1 |

FOREIGN PATENT DOCUMENTS

| | | | |
|---|---|---|---|
| FR | 2582592 | A1 | 12/1986 |
| KR | 20100127395 | A | 12/2010 |

OTHER PUBLICATIONS https://www.truckcamperadventure.com/eogs-f550-mammoth-rig-probably-largest-4x4-truck-camper-ever-built/, Jul. 19, 2022, 10 pages.

https://www.metro-magazine.com/10007287/innovative-suspension-system-provides-smoother-ride-for-buses, Jul. 19, 2022, 5 pages.

https://www.tirebusiness.com/article/20070124/NEWS/301249997/bfs-unit-upgrades-load-levelingsystem, Jul. 19, 2022, 7 pages.

https://www.amazon.com/LogicBlue-Technology-LevelMatePRO-Wireless-Leveling/dp/B01FGGSWPW/ref=cm_cr_arp_d_bdcrb_top?ie=UTF8, Jul. 19, 2022, 11 pages.

https://validmfg.com/product/vehicle-leveling-system/, Jul. 19, 2022, 3 pages.

https://blog.campingworld.com/rv-basics/level-your-rv-right-the-first-time/, Jul. 19, 2022, 12 pages.

https://www.amazon.com/Lippert-Components-358590-Leveling-Wireless/dp/B00PMAIG54, Jul. 10, 2022, 11 pages.

* cited by examiner

SUSPENSION SYSTEM FOR A VEHICLE

BACKGROUND

1. Field

The present disclosure relates to leveling systems for vehicles.

2. Description of Related Art

Some recreational vehicles, such as camper vans, recreational vehicles (RVs), and heavy-duty trucks with camper beds, may include a leveling system. These leveling systems may be configured to either level the vehicle with respect to the local topology of the ground or with respect to Earth's gravitational field (i.e., true earth or campsite leveling) such that the vehicle may be comfortably slept in.

However, many of these conventional leveling systems are separate from the vehicle's suspension system. For instance, some conventional leveling systems include hydraulic jacks that may be extended to level the vehicle. However, these leveling systems are complex and costly because the leveling system is separate from the vehicle's suspension. Additionally, jack leveling systems may provide too rigid of a connection between the vehicle and the ground such that high frequency vibrations are transferred throughout the vehicle when occupants move around or exit the vehicle. Furthermore, some campgrounds have thin asphalt surfaces and, particularly in hot summer months, do not allow for the use of leveling jacks because they may damage the soft asphalt. Also, when camped on gravel or dirt surfaces in winter or after heavy rains, the feet of the leveling jacks can get stuck in the ground, which makes it difficult to retract the leveling jacks. In addition to taking up valuable packaging space on the vehicle, leveling jacks also protrude a significant amount below the bottom of the vehicle frame, thereby decreasing the ground clearance, which is unsuitable for vehicles for off-road use.

Other conventional leveling systems include air bags that may be inflated to level the vehicle. However, conventional air bag leveling systems provide a soft spring rate, due to the high compressibility of the air inside the air bags, which may cause the vehicle to undesirably rock or sway when occupants move around the vehicle or exit the vehicle. Additionally, these conventional air bag leveling systems are open systems in which air is drawn in by a compressor from the ambient environment around the vehicle to raise the vehicle and in which air is expelled to the ambient environment to lower the vehicle.

Other conventional leveling systems include a series of dampers in parallel with springs, and a manifold configured to deliver and remove hydraulic fluid from the dampers to level the vehicle. However, when these dampers are locked into position after the vehicle has been leveled, the springs are effectively disengaged, and thus the vehicle's tires may provide the only suspension when the vehicle is locked in the leveled position. This may cause the sidewalls of the tires to flex, and since tires do not provide much damping, the vehicle is thus underdamped when it is locked in the level position. Accordingly, the vehicle may shudder or wobble for an extended period of time after occupants have stopped moving around the vehicle or exited the vehicle.

The above information disclosed in this Background section is only for enhancement of understanding of the background of the invention and therefore it may contain information that does not constitute prior art.

SUMMARY

The present disclosure relates to various embodiments of a closed leveling system for a vehicle. In one embodiment, the closed leveling system includes a suspension system having a number of corners, and each corner of the suspension system includes at least one strut configured to be coupled to at least one wheel of the vehicle. The leveling system also includes at least one sensor and a master controller in communication with the at least one sensor. The master controller includes a non-volatile memory device having computer-readable instructions and a processor in communication with the non-volatile memory device. The leveling system also includes a power module assembly including a reservoir containing a compressible liquid, a pump configured to withdraw a volume of the compressible liquid from the reservoir, at least one dump valve (such as a single dump valve) configured to transfer a volume of the compressible liquid into the reservoir, and a number of isolation valves in which each isolation valve is associated with at least one corner. The number of dump valves is less than the number of corners of the suspension system. The leveling system also includes a number of secondary volumes in selective fluid communication with the reservoir. Each secondary volume is associated with one isolation valve and at least one corner.

The closed leveling system may also include at least one flow restrictor between one of the secondary volumes and the reservoir. The flow restrictor may be an asymmetric bi-directional flow restrictor.

The closed leveling system may also include a number of rate valves. Each rate valve is associated with one of the secondary volumes. The rate valves are configured to move between an open configuration in which the secondary volumes are in fluid communication with the corners and a closed configuration in which the secondary volumes are isolated from the corners.

The closed leveling system may also include a number of auxiliary volumes in fluid communication with the secondary volumes. Each rate valve separates one auxiliary volume from a respective secondary volume.

The at least one sensor may include a first acceleration sensor and a second acceleration sensor.

The closed leveling system may also include a vehicle speed sensor in communication with the master controller.

The closed leveling system may also include a number of height sensors. Each height sensor is associated with one corner of the vehicle.

The closed leveling system may also include a steering position sensor in communication with the master controller.

The present disclosure relates to various embodiments of a closed leveling system for a vehicle. In one embodiment, the closed leveling system includes a suspension system having a number of corners, and each corner of the suspension system includes at least one strut configured to be coupled to at least one wheel of the vehicle. The closed leveling system also includes at least one sensor configured to measure a roll angle and a pitch angle of the vehicle, and a master controller in communication with the at least one sensor. The master controller includes a non-volatile memory device having computer-readable instructions containing a targeted angle for the roll angle and/or the pitch angle of the vehicle, and a processor in communication with the non-volatile memory device. The closed leveling system also includes a power module assembly including a reservoir containing a compressible liquid, a pump configured to withdraw a volume of the compressible liquid from the reservoir, at least one dump valve configured to transfer a volume of the compressible liquid into the reservoir, and a number of isolation valves. Each isolation valve is associated with at least one of the corners. The closed leveling system also includes a number of secondary volumes in selective fluid communication with the reservoir. Each secondary volume is associated with one isolation valve and at least one corner. In response to the roll angle and/or the pitch angle of the vehicle being outside a first threshold angle about the targeted angle, the computer-readable instructions, when executed by the processor, cause the master controller to raise at least one corner (by activating the pump and opening at least one isolation valve to deliver the compressible liquid to the corner) and/or lower at least one corner (by opening the dump valve and opening at least one isolation valve to withdraw a volume of the compressible liquid from the corner) to change the roll angle and/or the pitch angle to be inside the first threshold angle about the targeted angle.

Each isolator valve may be associated with one corner of the suspension system. One isolator valve may be associated with two corners of the suspension system.

The sensor configured to measure the roll angle and the pitch angle of the vehicle may be an accelerometer, a gyroscope, an inclinometer, a pair of height sensors, and/or an inertial measurement unit (IMU).

In response to the roll angle and/or the pitch angle of the vehicle being outside a second threshold angle about the targeted angle (the second threshold angle being greater than the first threshold angle), the computer-readable instructions, when executed by the processor, may cause the master controller to raise a pair of corners (by activating the pump and opening a pair of isolation valves to deliver the volume of the compressible liquid to the pair of corners) and/or lower a pair of corners (by opening the dump valve and opening a pair of isolation valves to withdraw a volume of the compressible liquid from the pair of corners) to change the roll angle and/or the pitch angle to be inside the second threshold angle about the targeted angle.

In response to the roll angle and/or the pitch angle of the vehicle being inside the first threshold angle about the targeted angle, the computer-readable instructions, when executed by the processor, may cause the master controller to close a number of rate valves separating the secondary volumes from the corners.

The computer-readable instructions, when executed by the processor, may cause the master controller to raise and/or lower at least one of the corners to preferentially change the pitch angle over the roll angle of the vehicle.

The present disclosure also relates to various embodiments of a vehicle. In one embodiment, the vehicle includes a cab on a frame (or a unibody), a number of wheels, a steering device operably coupled to at least one of the wheels, a user interface, and a closed leveling system. The closed leveling system includes a suspension system having a number of corners, and each corner of the suspension system includes at least one strut coupling at least one wheel to the frame or the unibody, at least one sensor (such as a number of height sensors, at least one acceleration sensor, and/or a steering sensor), and a master controller in communication with the sensor. The master controller includes a non-volatile memory device including computer-readable instructions, and a processor in communication with the non-volatile memory device. The closed leveling system also includes a power module assembly including a reservoir containing a compressible liquid, a pump configured to withdraw a volume of the compressible liquid from the reservoir, at least one dump valve configured to transfer a volume of the compressible liquid into the reservoir, and a number of isolation valves. Each isolation valve is associated with at least one corner. The closed leveling system also includes a number of secondary volumes in selective fluid communication with the reservoir. Each secondary volume is associated with one isolation valve and at least one corner. The instructions stored in the memory device, when executed by the processor, cause the closed leveling system to auto-calibrate the sensor in response to an input on the user interface. The instructions stored in the memory device, when executed by the processor, cause the closed leveling system to display an error on the user interface in response to the sensor outputting a signal outside of a normal operating range or that deviates beyond a threshold deviation from an expected value.

The sensor may be the height sensors, and the instructions stored in the memory device, when executed by the processor, may cause the master controller to determine a first signal output by a first height sensor associated with a first corner; send a command to raise the first corner from a first height to second height (by activating the pump and opening a first isolation valve to deliver the volume of the compressible liquid to the first corner); determine a second signal output by the first height sensor after the command; and display an error on the user interface in response to a difference between the second signal and the first signal being below a minimum threshold or the difference having a sign opposite to an expected sign.

The sensor may be the acceleration sensor and the instructions stored in the memory device, when executed by the processor, may cause the master controller to record a first axis output value, a second axis output value, and a third axis output value of the acceleration sensor; and set a maximum of the first axis output value, the second axis output value, and third axis output value as a heave axis of the acceleration sensor.

The sensor may be the acceleration sensor, and the instructions stored in the memory device, when executed by the processor, may cause the master controller to raise or lower front corners or rear corners (by activating the pump or opening the dump valve, and opening two of the isolation valves to deliver the volume of the compressible liquid to or from the front corners or the rear corners); record the first axis output value, the second axis output value, and the third axis output value of the acceleration sensor; set as a pitch axis of the acceleration sensor the first axis output value, the second axis output value, or the third axis output value that changed the most from raising or lowering the front corners or the rear corners; and set a remaining one of the first axis output value, the second axis output value, and the third axis output value as a roll axis of the acceleration sensor.

The instructions stored in the memory device, when executed by the processor, may cause the master controller to raise each corner to a maximum position; determine maximum output values of the height sensors at the maximum position; lower each corner to a minimum position; determine minimum output values of the height sensors at the minimum position; set at least one high height setting of the vehicle based on positions of the corners corresponding to a first percentage of the maximum output values; set at least one low height setting of the vehicle based on positions of the corners corresponding to a second percentage of the minimum output values; and set a normal height setting of the vehicle based on positions of the corners corresponding to intermediate output values of the height sensors between the maximum output values and the minimum output values.

The instructions stored in the memory device, when executed by the processor, may cause the master controller to move the corners to the normal height setting; and apply an offset to make an output of the heave axis of the acceleration sensor equal to 1.0 g and outputs of the pitch axis and the roll axis of the acceleration sensor both equal to 0.0 g.

The sensor may be the height sensors, and the instructions stored in the memory device, when executed by the processor, may cause the master controller to determine an initial output from each of the height sensors; raise or lower one corner; determine final outputs from each of the height sensors after the corner has been raised or lowered; and display an error on the user interface in response to a height sensor having a largest change between the initial output and the final output not being associated with the one corner that was raised or lowered.

The instructions stored in the memory device, when executed by the processor, may cause the leveling system to determine a weight imbalance on a front axle of the vehicle, and adjust heights of the corners to shift weight to one corner of a rear axle of the vehicle and to thereby reduce the weight imbalance on the front axle.

The present disclosure also relates to various embodiments of a vehicle. In one embodiment, the vehicle includes a cab on a frame (or a unibody), a number of wheels, a steering device operably coupled to at least one of the wheels, and a closed leveling system. The closed leveling system includes a suspension system having a number of corners, and each corner includes at least one strut coupling at least one wheel to the frame or the unibody. The leveling system also includes at least one sensor configured to measure a parameter related to a roll of the vehicle, a pitch of the vehicle, a yaw of the vehicle, and/or a height of the vehicle, and a master controller in communication with the sensor. The master controller includes a non-volatile memory device having computer-readable instructions, a processor in communication with the non-volatile memory device, a reservoir containing a compressible liquid, a number of isolation valves in which each isolation valve is associated with at least one corner, a number of secondary volumes in selective fluid communication with the reservoir in which each secondary volume is associated with one isolation valve and at least one corner, a number of rate valves in which each rate valve is associated with one secondary volume and in which the rate valves are configured to move between an open configuration in which the secondary volumes are in fluid communication with the corners and a closed configuration in which the secondary volumes are isolated from the corners, and a pump configured to withdraw a volume of the compressible liquid from the reservoir. Each rate valve is associated with at least one corner. The instructions stored in the memory device, when executed by the processor, cause the closed leveling system to adjust a duty cycle (DC) and/or a proportionality of at least one rate valve based on a position value, a velocity value, and a direction of at least one of the position value or the velocity value associated with the roll of the vehicle, the pitch of the vehicle, the yaw of the vehicle, and/or the height of the vehicle.

The sensor may include an accelerometer configured to measure the roll of the vehicle, the pitch of the vehicle, and the yaw of the vehicle; or a steering position sensor configured to measure the yaw of the vehicle, a first pair of height sensors configured to measure the roll of the vehicle, and a second pair of height sensors configured to measure the pitch of the vehicle.

The instructions stored in the memory device, when executed by the processor, may cause the closed leveling system to adjust the DC and/or the proportionality of the rate valve further based on the speed of the vehicle and/or braking of the vehicle.

The instructions stored in the memory device, when executed by the processor, may cause the closed leveling system to adjust the DC and/or the proportionality of the rate valve non-linearly and/or asymmetrically.

The instructions stored in the memory device, when executed by the processor, may cause the closed leveling system to adjust the DC and/or the proportionality of the rate valve with reference to a lookup table or a formula.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable leveling system for a vehicle.

BRIEF DESCRIPTION OF THE DRAWINGS

The features and advantages of embodiments of the present disclosure will be better understood by reference to the following detailed description when considered in conjunction with the drawings. The drawings are not necessarily drawn to scale.

DETAILED DESCRIPTION

The present disclosure relates to various embodiments of a leveling system for a vehicle (e.g., a recreational vehicle, such as a camper van, motorhome, overland adventure vehicle, a recreational vehicle (RV), a military vehicle; heavy-duty construction equipment; a heavy-duty truck with a camper bed; a mobile office vehicle; a mobile blood bank vehicle; or an ambulance). The leveling system of the present disclosure is configured to level the vehicle to the Earth's gravitational field (i.e., true earth leveling). The leveling system of the present disclosure is also integrated or integral with the suspension system of the vehicle, which reduces complexity compared to conventional leveling systems that are independent or separate from the vehicle suspension system.

Figure 1:
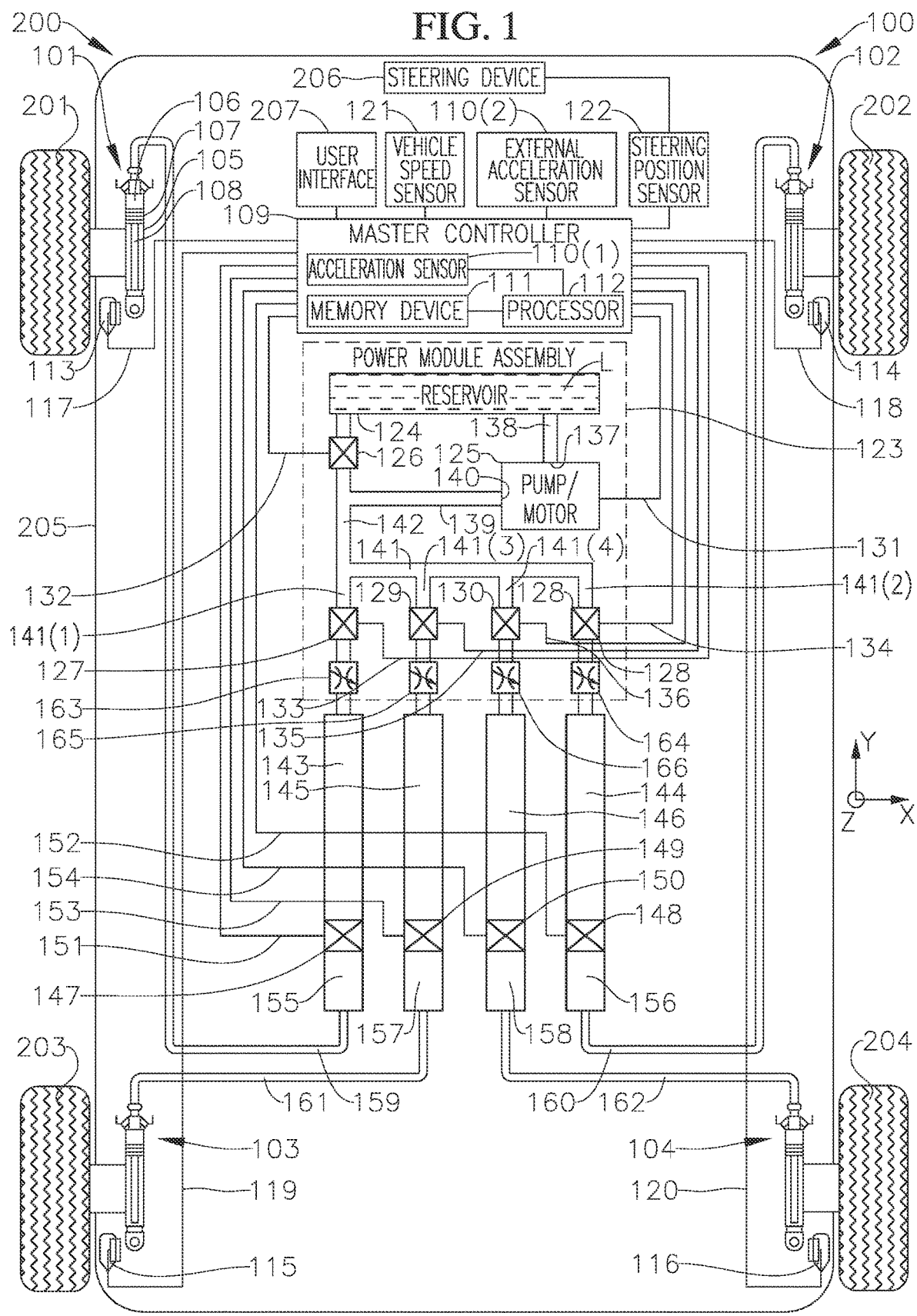
FIG. 1 is a schematic view of a leveling system in a vehicle according to one embodiment of the present disclosure.
Figure 2:
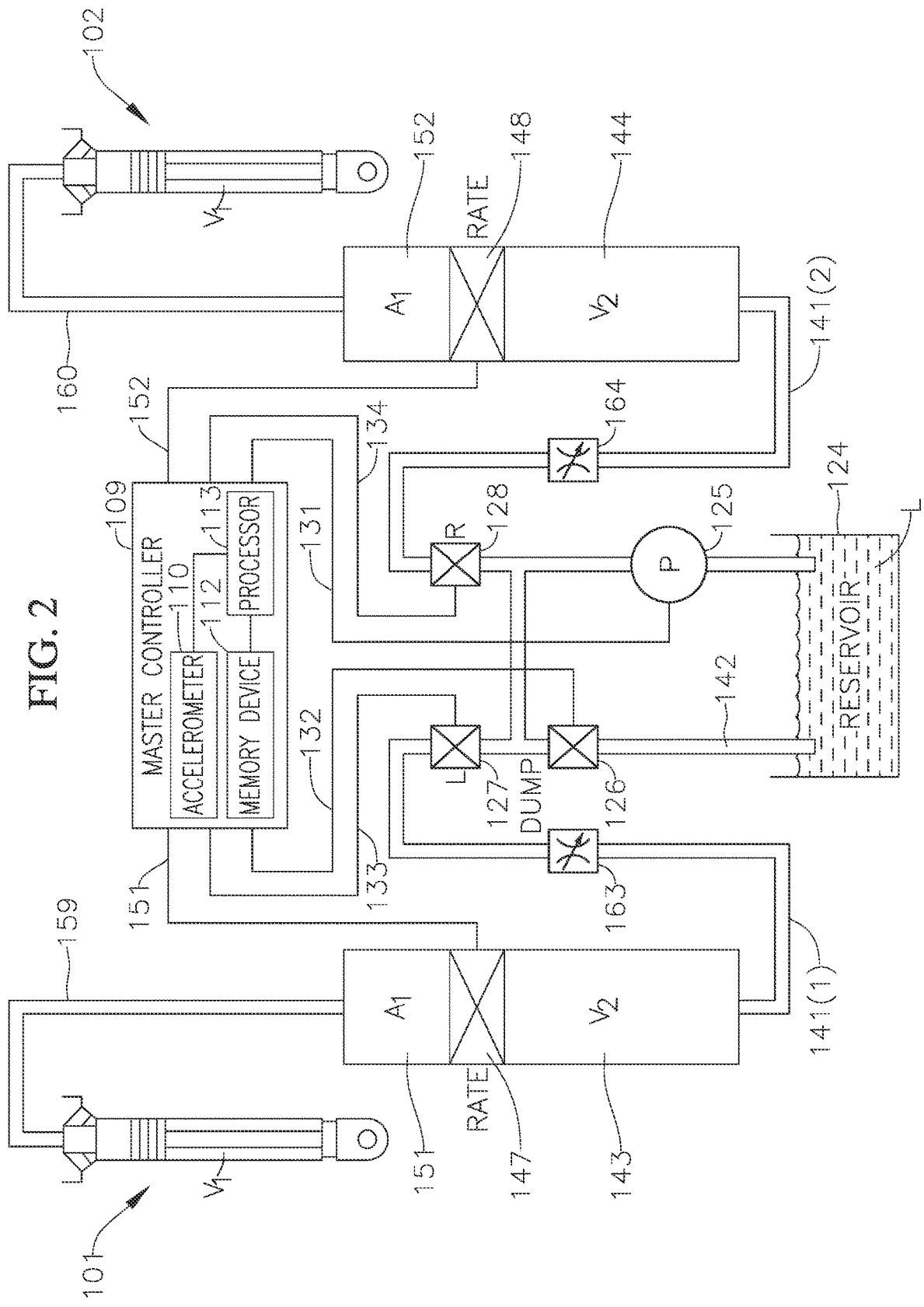
FIG. 2 is a schematic view of a portion of the embodiment of the leveling system illustrated in FIG. 1.

With reference now to FIGS. 1-2, a closed leveling system 100 for a vehicle 200 according to one embodiment of the present disclosure includes a plurality of corners (e.g., four corners, including a front left corner, a front right corner, a rear left corner, and a rear right corner), and each corner includes at least one strut coupled to at least one wheel of the vehicle 200 (e.g., a first strut 101 coupled to a left front wheel 201 at the front left corner, a second strut 102 coupled to a right front wheel 202 at the front right corner, a third strut 103 coupled to a left rear wheel 203 at the rear left corner, and a fourth strut 104 coupled to a right rear wheel 204 at the rear right corner). As described in detail below, the struts 101-104 both define the suspension system of the vehicle 200 (providing the spring rate of the vehicle 200) and are utilized to level the vehicle 200. In this manner, the leveling system 100 according to embodiments of the of the present disclosure is integrated or integral with the suspension system of the vehicle 200. Although in the illustrated embodiment the leveling system 100 includes one strut 101-104 per wheel 201-204 and only one wheel 201-204 per corner, in one or more embodiments, the leveling system 100 may include two or more struts at one or more corners and/or two or more wheels at one or more corners (e.g., the vehicle 200 may be a dually truck having a pair of left rear wheels and a pair of right rear wheels, and one or more struts for each pair of rear wheels). Although in the illustrated embodiment the leveling system 100 includes four corners, in one or more embodiments the leveling system 100 may include any other suitable number of corners, such as three corners. Furthermore, although in the illustrated embodiment the wheels 201-204 are coupled to tires, in one or more embodiments the wheels 201-204 may be coupled to one or more continuous tracks (e.g., the wheels 201-204 may be coupled to one or more continuous tracks in an embodiment in which the vehicle 200 is, for instance, a military vehicle or a heavy-duty construction machine).

Each strut 101-104 includes a cylinder 105 defining an interior chamber 106, a piston 107 configured to reciprocate within the interior chamber 106 of the cylinder 105, and a connecting rod 108 coupled to the piston 107. The connecting rod 108 of each strut 101-104 is coupled to one of the wheels 201-204 of the vehicle 200 and the cylinder 105 of each strut 101-104 is connected to the frame or the unibody 205 of the vehicle 200. The connections between the connecting rods 108 of the struts 101-104 and the wheels 201-204 of the vehicle 200 are shown schematically in FIG. 1. In one or more embodiments, the connecting rod 108 of each strut 101-104 may be coupled to the frame or the unibody 205 of the vehicle 200 and the cylinder 105 of each strut 101-104 may be connected to one of the wheels 201-204 of the vehicle 200.

In the illustrated embodiment, the leveling system 100 also includes a master controller 109 (e.g., an electronic control unit (ECU)) configured to control operation of the various components of the leveling system 100. In the illustrated embodiment, the master controller 109 includes an acceleration sensor 110(1) (e.g., an accelerometer, a gyroscope, an inclinometer, a pair of height sensors, or an inertial measurement unit (IMU)) configured to generate one or more electric signals representative of the roll angle of the vehicle and the pitch angle of the vehicle 200 (e.g., the acceleration sensor 110(1) is internal to the master controller 109). In one or more embodiments, the acceleration sensor 110(1) may be external to the master controller 109 and in communication with the master controller 109. In one or more embodiments, the leveling system 100 may also include one or more additional acceleration sensors 110(2) (e.g., one or more additional accelerometers, gyroscopes, inclinometers, height sensors, or IMUs) coupled to the master controller 109. Accordingly, in one or more embodiments, the acceleration sensor 110(1) may be internal to the master controller 109 and the acceleration sensor 110(2) may be external to the master controller 109, or both acceleration sensors 110(1) and 110(2) may be external to the master controller 109. The master controller 109 also includes a non-volatile memory device 111 (e.g., flash memory) and a processor 112 (e.g., a micro-controller) connected to the non-volatile memory device 111. The non-volatile memory device 111 stores computer-readable instructions (i.e., computer-executable instructions) which, when executed by the processor 112, cause the master controller 109 to operate the pump/motor 125 and the valves (described below) of the leveling system 100 in response to signals output by the internal acceleration sensor 110(1) and/or the external acceleration sensor 110(2) to level the vehicle 200 to true earth.

As used herein, the term "processor" includes any combination of a circuit, hardware, firmware, memory, and software, employed to process data or digital signals. The hardware of a controller may include, for example, a microcontroller, application specific integrated circuits (ASICs), general purpose or special purpose central processors (CPUs), digital signal processors (DSPs), graphics processors (GPUs), and/or programmable logic devices such as field programmable gate arrays (FPGAs). In a processor, as utilized herein, each function is performed either by hardware configured, i.e., hard-wired, to perform that function, or by more general purpose hardware, such as a CPU, configured to execute instructions stored in a non-transitory storage medium or memory. A processor may contain two or more processors, for example, a processor may include two processors, an FPGA and a CPU, interconnected on a PCB.

In the illustrated embodiment, the leveling system 100 also includes one height sensor for each of the wheels 201-204 of the vehicle 200 (e.g., a first height sensor 113 coupled to the left front wheel 201, a second height sensor 114 coupled to the right front wheel 202, a third height sensor 115 coupled to the left rear wheel 203, and a fourth height sensor 116 coupled to the right rear wheel 204). That is, in the illustrated embodiment, the leveling system 100 includes one height sensor in each of the corners of the leveling system 100. The height sensors 113-116 are operable to generate electrical signals representative of the relative displacement between the vehicle frame and the wheels 201-204, respectively, which corresponds to the relative displacement of the piston 107 into the interior chamber 106 of the cylinder 105 of the respective strut 101-104. The height sensors 113-116 are electrically coupled to the master controller 109 (e.g., wirelessly or via wires 117-120, respectively) such that the master controller 109 receives the electrical signals output by the height sensors 113-116. As described in detail below, the master controller 109 is configured to selectively operate the pump/motor 125, the dump valve 126, and the isolator valves 127-130 to extend or retract the struts 101-104 to level the vehicle 200 based on the electric signals output by the height sensors 113-116.

In the illustrated embodiment, the leveling system 100 also includes a vehicle speed sensor 121 that is operable to generate an electrical signal indicating the speed of the vehicle 200. The vehicle speed sensor 121 is coupled to the master controller 109 such that the master controller 109 receives the electrical signal output by the vehicle speed sensor 121.

In the illustrated embodiment, the leveling system 100 also includes a steering position sensor 122 that is operable to generate an electrical signal indicating the position (e.g., angle) of the steering device 206 (e.g., a steering wheel, a joystick, or lap bars) of the vehicle 200. In one or more embodiments, the steering position sensor 122 may also output a signal indicating the steering position velocity (e.g., the rate of rotation) of the steering device 206. In one or more embodiments, the processor 112 may calculate or determine the steering position velocity based on the signal output from the steering position sensor 122 that indicates the position of the steering device 206 of the vehicle 200 (e.g., in an embodiment in which the steering device 206 is a steering wheel, the processor 112 may calculate or determine the time-derivative of the signal indicating the angle at which the steering device 206 of the vehicle 200 is rotated). The steering position sensor 122 is coupled (wirelessly or via one or more wires) to the master controller 109 such that the master controller 109 receives the electrical signal output by the steering position sensor 122.

In the illustrated embodiment, the leveling system 100 also includes a power module assembly 123 including a reservoir 124, a pump/motor 125, a dump valve 126, and one isolation valve for each of the struts 101-104 (e.g., a first isolation valve 127 for the first strut 101 at the left front wheel 201, a second isolation valve 128 for the second strut 102 at the right front wheel 202, a third isolation valve 129 for the third strut 103 at the left rear wheel 203, and a fourth isolation valve 130 for the fourth strut 104 at the right rear wheel 204). That is, in the illustrated embodiment, the leveling system 100 includes one isolator valve 127-130 for each of the corners of the leveling system 100. In one or more embodiments, the leveling system 100 may include fewer isolator valves than corners of the leveling system 100. For instance, in one or more embodiments, one or more of the isolator valves may be associated with two corners of the leveling system 100 (e.g., one isolator valve may be associated with the strut(s) in the left front corner and the strut(s) in the right front corner, and/or one isolator valve may be associated with the strut(s) in the left rear corner and the strut(s) in the right rear corner). The pump/motor 125, the dump valve 126, and the isolation valves 127-130 of the power module assembly 123 are electrically coupled (e.g., wirelessly or via wires 131-136, respectively) to the master controller 109. In the illustrated embodiment, unlike some conventional leveling systems, the leveling system 100 of the present disclosure does not include an accumulator, which simplifies and reduces the cost of the leveling system 100 compared to these conventional leveling systems. Additionally, in the illustrated embodiment, the power module assembly 123 includes a single dump valve 126, which reduces the complexity and the cost of the system compared to conventional systems that commonly include one dump valve for each strut. In one or more embodiments, the power module assembly 123 may include a number of dump valves that is less than the number of struts (e.g., in an embodiment in which the leveling system 100 includes four struts 101-104, the power module assembly 123 may include three dump valves, two dump valves, or a single dump valve).

The reservoir 124 contains a volume of compressible liquid L (e.g., silicone oil). The compressible liquid L in the reservoir 124 is in fluid communication with an inlet 137 of the pump 125 via an inlet conduit 138 (e.g., an inlet pipe or tube) and an outlet conduit 139 (e.g., an outlet pipe or tube) connected to an outlet 140 of the pump 125 places the pump 125 in fluid communication with the isolation valves 127-130 via a quadfircated conduit 141 (e.g., a quadfircated pipe or tube). Each of the branches 141(1)-141(4) of the quadfircated conduit 141 is connected to one of the isolation valves 127-130, respectively.

The reservoir 124 is also in fluid communication with the quadfircated conduit 141 and the isolation valves 127-130 via a return conduit 142 (e.g., a return pipe or tube) that bypasses the pump 125. The dump valve 126 is located along the return conduit 142 such that the dump valve 126 is located between the isolation valves 127-130 and the reservoir 124. Additionally, in the illustrated embodiment, the outlet conduit 139 branches off of the return conduit 142. As used herein, the leveling system is "closed" because the compressible liquid L utilized to raise and lower the corners of the leveling system 100 is self-contained within the leveling system 100. That is, the compressible liquid L utilized in the closed leveling system 100 is not drawn from or expelled to the environment surrounding the vehicle 200. In contrast, open leveling systems, such as the air bag systems described in the Background section herein, draw in ambient air through a compressor to raise the vehicle and expel air to the ambient environment to lower the vehicle.

In the illustrated embodiment, the leveling system 100 also includes one secondary volume for each of the struts 101-104 (e.g., a first secondary volume 143 coupled to first strut 101 at the left front wheel 201, a second secondary volume 144 coupled to the second strut 102 at the right front wheel 202, a third secondary volume 145 coupled to the third strut 103 at the left rear wheel 203, and a fourth secondary volume 146 coupled to the fourth strut 104 at the right rear wheel 204). Each branch 141(1)-141(4) of the quadfircated conduit 141 is connected to one of the secondary volumes 143-146, respectively. Additionally, the leveling system 100 includes one rate vale for each of the secondary volumes 143-146 (e.g., a first rate valve 147 coupled to the first secondary valve 143, a second rate valve 148 coupled to the second secondary valve 144, a third rate valve 149 coupled to the third secondary valve 145, and a fourth rate valve 150 coupled to the fourth secondary valve 146). The rate valves 147-150 are electrically coupled (e.g., wirelessly or via wires 151-154, respectively) to the master controller 109. Each of the rate valves 147-150 is configured to move between a closed configuration in which the associated secondary volume 143-146 is fluidly isolated from the associated strut 101-104, and an open configuration in which the secondary volume 143-146 is in fluid communication with the associated strut 101-104. Although in the illustrated embodiment the height sensors 113-116, the pump/motor 125, the dump valve 126, the isolation valves 127-130, and the rate valves 147-150 are in communication with master controller 109 via the wires 117-120, 131, 132, 133-136, and 151-154, respectively, in one or more embodiments, the height sensors 113-116, the pump/motor 125, the dump valve 126, the isolation valves 127-130, and/or the rate valves 147-150 may be in communication with the master controller 109 via a controller area network (CAN) in which data packets are transmitted to and/or from the master controller 109.

Additionally, in the illustrated embodiment, the leveling system 100 includes one auxiliary volume for each of the struts 101-104 (e.g., a first auxiliary volume 155 coupled to the first strut 101 at the left front wheel 201, a second auxiliary volume 156 coupled to the second strut 102 at the right front wheel, a third auxiliary volume 157 coupled to the third strut 103 at the left rear wheel, and a fourth auxiliary volume 158 coupled to the fourth strut 104 at the right rear wheel 204). In the illustrated embodiment, the rate valves 147-150 separate the auxiliary volumes 155-158 from the secondary volumes 143-146, respectively. In the illustrated embodiment, the auxiliary volumes 155-158 are in constant fluid communication with the struts 101-104, respectively, which increases the effective volume of the compressible liquid in the struts 101-104 and reduces the spring rate of the struts 101-104. The auxiliary volumes 155-158 may be sized based on the desired spring rate of the struts 101-104. The auxiliary volumes 155-158 are in fluid communication with the struts 101-104 via conduits 159-162, respectively. In one or more embodiments, the leveling system 100 may not include the auxiliary volumes 155-158. The secondary volumes 143-146 are in selective fluid communication with the struts 101-104, via the conduits 159-162, respectively, when the rate valves 147-150 are open.

As described in more detail below, the pump 125 is configured to raise one or more of the struts 101-104 during a process of leveling the vehicle 200 by opening one or more of the isolation valves 127-130 and activating the pump 125 to withdraw compressible liquid L from the reservoir 124 through the inlet conduit 138 and delivering the compressible liquid L from the reservoir 124 to the one or more struts 101-104 through the outlet conduit 139, the branches 141(1)-141(4) of the quadfircated conduit 141 associated with the open isolation valves 127-130, the secondary volumes 143-146 associated with the open isolation valves 127-130, the auxiliary volumes 155-158 (if present) associated with the open isolation valves 127-130, and the conduits 159-162 associated with the open isolation valves 127-130 to the associated struts 101-104. Additionally, as described in more detail below, the leveling system 100 is configured to lower one or more of the struts 101-104 during the process of leveling the vehicle 200 by opening the dump valve 126 and one or more of the isolation valves 127-130 and withdrawing compressible liquid L from one or more of the struts 101-104 through the conduits 159-162 associated with the open isolation valves 127-130, the auxiliary volumes 155-158 (if present) associated with the open isolation valves 127-130, the secondary volumes 143-146 associated with the open isolation valves 127-130, the branches 141(1)-141(4) of the quadfircated conduit 141 associated with the open isolation valves 127-130, and through the return conduit 142 and into the reservoir 124.

In one or more embodiments, the leveling system 100 may include a number of flow restrictors 163-166 between the secondary volumes 143-146, respectively, and the reservoir 124 (e.g., the flow restrictors 163-166 may be along the branches 141(1)-141(4), respectively, of the quadfircated conduit 141 between the isolation valves 127-130, respectively, and the quadfircated conduit 141, or the flow restrictors 163-166 may be along the branches 141(1)-141(4), respectively, of the quadfircated conduit 141 between the isolation valves 127-130 and the secondary volumes 143-146, respectively). In one or more embodiments, one or more of the flow restrictors 163-166 may be a uni-directional flow restrictor that is configured to restrict the flow of the compressible liquid from the struts 101-104 but not restrict (or substantially not restrict) the flow of the compressible liquid to the struts 101-104. In one or more embodiments, one or more of the flow restrictors 163-166 may be an asymmetric bi-directional flow restrictor that is configured to restrict the flow of the compressible liquid from the struts 101-104 to a greater extent than it restricts the flow of the compressible liquid to the struts 101-104 (e.g., the flow restrictors 163, 166 may be configured to restrict the withdrawal of the compressible liquid from the struts 101-104 to a greater extent than they restrict the flow of the compressible liquid to the struts 101-104). In one or more embodiments, the bi-directional flow restrictors 163-166 may be configured to restrict the flow of the compressible liquid from the struts 101-104 by an amount in a range from approximately 20% to approximately 70% greater than the amount that the bi-directional flow restrictors 163-166 restrict the flow of the compressible liquid to the struts 101-104.

In general, when the vehicle is unevenly loaded, the more lightly loaded corner raises much faster than more heavily loaded corner. Conversely, the more heavily loaded corner lowers much more quickly than the lightly loaded corner. Accordingly, in related art leveling systems, an unevenly loaded vehicle tends to lean when being raised or lowered, which may be unacceptable in certain applications. The flow restrictors 163-166 are configured to prevent (or at least mitigate against) this leaning when raising and lowering an unevenly loaded vehicle. For example, when lowering an unevenly loaded vehicle in which the load on the front left strut 101 is greater than the load on the front right strut 102, the bi-directional flow restrictors 163 and 164 are configured to restrict the flow of the compressible liquid L from the struts 101 and 102 such that the flow rates are approximately even or at least closer to even than they would be in the absence of the flow restrictors 163 and 164, which eliminates or at least reduces the extent to which the vehicle leans during lowering. Similarly, when raising an unevenly loaded vehicle in which the load on the front left strut 101 is greater than the load on the front right strut 102, the bi-directional flow restrictors 163 and 164 are configured to restrict the flow of the compressible liquid L to the struts 101 and 102 such that the flow rates are approximately even or at least closer to even than they would be in the absence of the flow restrictors 163 and 164, which eliminates or at least reduces the extent to which the vehicle leans during raising.

Additionally, in one or more embodiments, the instructions stored in the non-volatile memory device 111 of the master controller 109, when executed by the processor 112, may cause the master controller 109 to adjust the widths of the pulses supplied to the isolation valves 127-130 when the vehicle 200 is unevenly loaded in order to reduce the extent to which the vehicle 200 leans during raising and lowering. Controlling the pulse widths associated with the isolation valves 127-130, in conjunction with the presence of the flow restrictors 163-166, is configured to further reduce the extent to which the vehicle 200 leans during raising and lowering.

In one or more embodiments, the leveling system 100 is configured to auto-calibrate one or more of the sensors of the leveling system 100 after the leveling system 100 has been installed on the vehicle 200 and the sensors have been installed on the leveling system 100. Auto-calibrating the sensors once installed on the vehicle 200 is more accurate and convenient than conventional methods of bench calibrating the sensors prior to installation on the vehicle 200. In one or more embodiments, the instructions stored in the memory device 112, when executed by the processor 112, cause the leveling system 100 to auto-calibrate the height sensors 113-116, one or more of the acceleration sensors 110(1), 110(2), and/or the steering sensor 122 in response to an input on a user interface 207 in communication with the vehicle 200. The user interface device 207 may be any suitable type or kind of device that enables user selections/input, such as, for example, a touch screen (e.g., an LED or an LCD screen), a button, a switch, a dial, or a smart device (e.g., a smartphone). In one or more embodiments, the user interface device 207 may be integrated into the vehicle 200 (e.g., the user interface device 207 may be on the dash inside the cab on the frame (or on the dash inside the unibody) 205 of the vehicle 200) or the user interface device 207 may be separate from the vehicle 200 (e.g., the user interface device 207 may be a smartphone that is paired to the vehicle 200). In one or more embodiments, a user may enter a command or make a selection using the user interface device 207 by, for example, selecting an icon displayed on a touch screen, pressing a button, turning a dial, flipping a switch, or speaking a verbal command. In one or more embodiments, the instructions stored in the memory device 111, when executed by the processor 112, cause the leveling system 100 to display an error on or by the user interface 207 in response to any one of the plurality of height sensors 113-116, the at least one acceleration sensor 110(1), 110(2), or the steering position sensor 122 outputting a signal outside of a normal operating range or outputting a signal that deviates beyond a threshold deviation from an expected value (e.g., the signal output by one of the sensors is outside of a normal operating range, or the signal is within the normal operating range but deviates too far from an expected value based on the operating conditions of the leveling system 100 and/or the vehicle 200). In one or more embodiments, the error may include an error message or symbol displayed on the touch screen (e.g., a touch screen in the vehicle 200 or on a user's smartphone), an indicator light illuminating (e.g., a red light illuminating in the vehicle 200 or on a user's smartphone), and/or an auditory error message emitting from speaker(s) in the smart device or in the vehicle 200.

In one or more embodiments, the leveling system 100 is configured to auto-calibrate one or more of the height sensors 113-116. In one or more embodiments, the instructions stored in the memory device 111, when executed by the processor 112, cause the leveling system 100 to determine a signal output (e.g., a voltage output) by one height sensor (e.g., the left front height sensor 113) associated with one strut (e.g., the front left strut 101) when the strut 101 is in an initial state. The instructions stored in the memory device 111, when executed by the processor 112, cause the leveling system 100 to send a command to raise the strut 101 from a first height to second height by activating the pump 125 and opening the isolation valve 127 to deliver the volume of the compressible liquid L to the first strut 101. The instructions stored in the memory device 111, when executed by the processor 112, cause the leveling system 100 to determine a second signal output (e.g., a second voltage) by the first height sensor 113 after the command has been sent by the processor 112 to raise the strut 101 from the first height to the second height, and to display an error on or from the user interface 207 in response to a difference between the second signal and the first signal being below a minimum threshold or difference between the second signal and the first signal having a sign (i.e., positive or negative) that is opposite of the expected sign (i.e., negative or positive). A difference between the second signal and the first signal that is below a minimum threshold suggests or indicates that the height sensor 113 is not functioning properly to detect changes in the height of the strut 101 and/or that the strut 101 is not functioning properly to raise/lower the vehicle 200. A difference between the second signal and the first signal that has a sign (e.g., a negative value) opposite to the expected sign (e.g., a positive value) indicates that the height sensor 113 is installed upside-down or that the height sensor 113 is wired incorrectly. Although the foregoing description has been described with reference to the left front height sensor 113, the same process may be performed to auto-calibrate the other height sensors (e.g., the right front height sensor 114, the left rear height sensor 115, and/or the right rear height sensor 116).

In one or more embodiments, the instructions stored in the memory device 111, when executed by the processor 112, cause the master controller 109 to raise or lower one corner of the leveling system 100 (e.g., raise or lower one of the struts 101-104), determine the outputs (e.g., output voltages) from the height sensors 113-116, and display an error on the user interface 207 in response to the outputs of the height sensors 113-116 not matching expected outputs, which may be stored in the memory device 111 of the master controller 109. In one or more embodiments, the instructions stored in the memory device 111, when executed by the processor 112, cause the master controller 109 to display an error on the user interface 207 in response to the height sensor 113-116 that has the greatest change in output (due to the raising or lowering of the corner) not being associated with the corner (e.g., the one strut 101-104) that was raised or lowered. For instance, in one or more embodiments, the instructions stored in the memory device 111, when executed by the processor 112, may cause the master controller 109 to raise the front left corner (e.g., strut 101) of the leveling system 100 and to display an error on the user interface 207 in response to any height sensor (e.g., 114-116) other than the front left height sensor 113 experiencing the greatest change in output due to the raising of the front left corner (e.g., strut 101). In one or more embodiments, the error may include an error message or symbol displayed on the touch screen, an indicator light illuminating (e.g., a red light illuminating), and/or an auditory error message emitting from speaker(s) in the vehicle 200.

In one or more embodiments, the leveling system 100 is configured to auto-calibrate the orientation of the one or more acceleration sensors 110(1) and 110(2). In one or more embodiments, the instructions stored in the memory device 111, when executed by the processor 112, cause the master controller 109 to record (e.g., store in the memory device 112) a first axis output value, a second axis output value, and a third axis output value of the at least one acceleration sensor 110(1) and 110(2) (e.g., the master controller 109 is configured to record output values of at least one acceleration sensor 110(1) and 110(2) corresponding to mutually orthogonal axes). Additionally, in one or more embodiments, the instructions stored in the memory device 111, when executed by the processor 112, cause the master controller 109 to set a maximum of the first axis output value, the second axis output value, and third axis output value as the heave axis (the z-axis in FIG. 1) of the at least one acceleration sensor 110(1) and 110(2). When the vehicle is stationary, the axis of the acceleration sensor 110(1) and/or 110(2) that outputs the largest value is the heave axis of the acceleration sensor 110(1) and/or 110(2) because the gravitational field is the largest force acting on the acceleration sensor 110(1) and/or 110(2). In one or more embodiments, the instructions stored in the memory device 111, when executed by the processor 112, further cause the master controller 109 to raise or lower front corners or rear corners of the leveling system 100 (e.g., raising or lowering the left front strut 101 and the right front strut 102, or raising or lowering the left rear strut 103 and the right rear strut 104) by activating the pump 137 (if raising) or opening the dump valve 126 (if lowering), and opening two corresponding isolation valves (e.g., opening the left front isolation valve 127 and the right front isolation valve 128 if raising or lowering the front corners, or opening the left rear isolation valve 129 and the right rear isolation valve 130 if raising or lowering the rear corners) to deliver the volume of the compressible liquid L to or from the front corners (left front strut 101 and the right front strut 102) or to or from the rear corners (the left rear strut 103 and the right rear strut 104). In one or more embodiments, the instructions stored in the memory device 111, when executed by the processor 112, cause the master controller 109 to record the first axis output value, the second axis output value, and the third axis output value of the acceleration sensor 110(1) and/or 110(2) following the task of raising or lowering the front corners or the rear corners. In one or more embodiments, the instructions stored in the memory device 111, when executed by the processor 112, cause the master controller 109 to set as the pitch axis (x-axis in FIG. 1) of the acceleration sensor 110(1) and/or 110(2) the first axis output value, the second axis output value, or the third axis output value that changed the most from raising or lowering the front corners or the rear corners, and setting a remaining one of the first axis output value, the second axis output value, and the third axis output value as the roll axis (y-axis in FIG. 1) of the acceleration sensor 110(1) and/or 110(2).

In one or more embodiments, the instructions stored in the memory device 111, when executed by the processor 112, cause the master controller 109 to raise each corner of leveling system 100 to a maximum position by opening the isolation valves 127-130 and delivering the compressible fluid L from the reservoir 124 to the struts 101-104, and determine maximum output values of the height sensors 113-116 when the corners (e.g., the struts 101-104) are at their maximum positions. Additionally, in one or more embodiments, the instructions stored in the memory device 111, when executed by the processor 112, cause the master controller 109 to lower each corner of the leveling system 100 to a minimum position by opening the dump valve 126 and withdrawing the compressible liquid L from the corners (e.g., the struts 101-104), and determining the minimum output values of the height sensors 113-116 when the corners (e.g., the struts 101-104) are at their minimum positions. The instructions stored in the memory device 111, when executed by the processor 112, also cause the master controller 109 to calculate or determine the relationship between the output values and the heights of the corners (e.g., the struts 101-104), set the minimum output values as 0%, and set the maximum output values as 100%. The instructions stored in the memory device 111, when executed by the processor 112, also cause the master controller 109 to set at least one high height setting of the vehicle 200 in which the corners (e.g., the struts 101-104) have positions corresponding to a preset or selectable percentage near or proximate to 100%, set at least one low height setting of the vehicle 200 in which the corners (e.g., the struts 101-104) have positions corresponding to a preset or selectable percentage near or proximate to 0%, and set an intermediate height setting of the vehicle 200 in which the corners (e.g., the struts 101-104) have positions corresponding to a preset or selectable intermediate percentage between 0% and 100%. In one or more embodiments, the at least one high height setting of the vehicle 200 may include a first high height setting in which the corners (e.g., the struts 101-104) have positions corresponding to a first percentage (e.g., in a range from approximately 90% to approximately 98%), and a second high height setting less than the first high height setting in which the corners (e.g., the struts 101-104) have positions corresponding to a second percentage (e.g., in a range from approximately 70% to approximately 90%) that is less than the first percentage. Similarly, in one or more embodiments, the at least one low height setting of the vehicle 200 may include a first low height setting in which the corners (e.g., the struts 101-104) have positions corresponding to a first percentage (e.g., in a range from approximately 2% to approximately 15%), and a second low height setting greater than the first low height setting in which the corners (e.g., the struts 101-104) have positions corresponding to a second percentage (e.g., in a range from approximately 15% to approximately 40%) that is greater than the first percentage. Furthermore, in one or more embodiments, the instructions stored in the memory device 111, when executed by the processor 112, also cause the master controller 109 to move the corners of the leveling system 100 to the newly calculated normal height setting by opening the isolation valves 127-130 (and opening the dump valve 126 if the vehicle 200 is being lowered from the maximum height setting) to withdraw or transfer the compressible liquid L from or to the corners (e.g., the struts 101-104). In one or more embodiments, the instructions stored in the memory device 111, when executed by the processor 112, also cause the master controller 109 to apply an offset to make the output of the heave axis of the acceleration sensor 110(1) and/or 110(2) equal to 1.0 g (or approximately 1.0 g) and to make the outputs of the pitch axis and the roll axis of the acceleration sensor 110(1) and/or 110(2) both equal to 0.0 g (or approximately 0.0 g). Following this process, the acceleration sensor 110(1) and/or 110(2) has been auto-calibrated such that the three axis output values of the acceleration sensor 110(1) and/or 110(2) are mapped to the heave axis, the pitch axis, and the roll axis of the vehicle 200, and the height sensors 113-116 are configured to measure any deviations of the vehicle 200 from the normal height setting.

In one or more embodiments, the leveling system 100 is configured to eliminate or at least reduce a weight imbalance on the vehicle 200, which may be due to the manner in which various objects are arranged inside the vehicle 200. In one or more embodiments, the instructions stored in the memory device 111, when executed by the processor 112, may cause the master controller 109 to determine the weight imbalance on the front axle of the vehicle 200 in any suitable manner, such as by referencing the outputs from pressure sensors at the front left and front right corners or by measuring the different current loads supplied from the pump/motor 125 to the front left and front right corners. In one or more embodiments, the instructions stored in the memory device 111, when executed by the processor 112, cause the master controller 109 to raise the front left corner and the front right corner (e.g., the front left strut 101 and the front right strut 102), simultaneously or alternately, by activating the pump 137 and opening the two associated isolation valves 127 and 128 to deliver a volume of the compressible liquid L to the front left corner and the front right corner (e.g., the front left strut 101 and the front right strut 102). The instructions stored in the memory device 111, when executed by the processor 112, also cause the master controller 109 to determine a weight imbalance on the front axle of the vehicle 200 (along which the front struts 101 and 102 are coupled) based on a difference between the rate at which the front left strut 101 raises and the rate at which the front right strut 102 raises. In general, the more heavily loaded strut will raise more slowly than the more lightly loaded strut. Additionally, in one or more embodiments, the instructions stored in the memory device 111, when executed by the processor 112, cause the master controller 109 to adjust heights of one or more of the corners (e.g., one or more of the struts 101-104) to shift weight to one corner of the rear axle of the vehicle 200 and thereby reduce the weight imbalance on the front axle of the vehicle 200. A load imbalance on the front axle of the vehicle 200 may cause the vehicle 200 to handle differently when turning right versus turning left, to pull to one side when driving straight, and/or increase the likelihood of overloading the front tires. Shifting weight to the rear axle to eliminate (or at least reduce) the weight imbalance eliminates (or at least mitigates against) these detriments associated with a weight imbalance on the front axle of the vehicle 200.

In operation, the leveling system 100 is configured to level the vehicle 200 in three different conditions: (1) while the vehicle 200 is parked; (2) while the vehicle 200 is driving; and (3) while the vehicle 200 is parked overnight for camping (i.e., true Earth, campsite leveling). Thus, the leveling system 100 according to one or more embodiments of the present disclosure has three different leveling modes. In one or more embodiments, the vehicle 200 may have only one or two of the leveling modes.

In the first leveling mode (i.e., leveling the vehicle while parked), the master controller 109 receives the electronic signals from the height sensors 113-116 that indicate the relative heights of each of the corners (e.g., the struts 101-104). The instructions stored in the non-volatile memory device 111 of the master controller 109, when executed by the processor 112, cause the master controller 109 to calculate or determine which of the corners (e.g., the struts 101-104) need to be raised, lowered, or remain at their current height to achieve ride height based leveling (or substantial ride height leveling) of the vehicle 200 based on the output signals from the height sensors 113-116. To raise one or more of the corners, the master controller 109 sends a control signal, wirelessly or via wire 131, to activate the pump/motor 125 and sends control signals, wireless or via one or more of the wires 133-136, to open the isolation valve(s) 127-130 associated with the corner(s) (e.g., the strut(s) 101-104) that need to be raised such that compressible liquid L flows into the corner(s) (e.g., the strut(s) 101-104) that need to be raised. To lower one or more of the corners, the master controller 109 sends a control signal, wirelessly or via wire 132, to open the dump valve 126 and sends control signals, wirelessly or via wire(s) 133-136, to open the isolation valve(s) 127-130 associated with the corner(s) (e.g., the strut(s) 101-104) that need to be lowered such that compressible liquid L flows out of the corner(s) (e.g., the strut(s) 101-104) that need to be lowered.

In the second leveling mode (i.e., leveling while driving), the master controller 109 receives the electronic signals from the height sensors 113-116 that indicate the relative heights of each of the corners (e.g., the struts 101-104). The instructions stored in the non-volatile memory device 111 of the master controller 109, when executed by the processor 112, cause the master controller 109 to calculate an average of the output signal from each of the height sensors 113-116 over a predefined time period (e.g., approximately 1 second) and to calculate or determine which of the struts 101-104 need to be raised, lowered, or remain at their current height to achieve average ride height leveling (or substantial average ride height leveling) of the vehicle 200 based on the averages of the output signals from the height sensors 113-116. In the second leveling mode, the master controller 109 is configured to raise and lower the struts 101-104 in the same manner as that described above regarding the first leveling mode.

Additionally, in one or more embodiments, the instructions stored in the non-volatile memory device 111 of the master controller 109, when executed by the processor 112, cause the master controller 109 to send signals (e.g., wirelessly or via the wires 151-154) to pulse the rate valves 147-150 or completely close the rate valves 147-150 in response to driver inputs (e.g., steering, acceleration, and/or braking inputs) and/or road inputs (e.g., strut travel due to uneven road conditions) to improve the handling of the vehicle 200. Closing the rate valves 147-150 reduces the effective volume of the compressible liquid L in the corners (e.g., the struts 101-104) by separating the corners (e.g., the struts 101-104) from the secondary volumes 143-146, which increases the stiffness of corners (e.g., the struts 101-104). Additionally, in one or more embodiments, the instructions stored in the non-volatile memory device 111 of the master controller 109, when executed by the processor 112, cause the master controller 109 to level the vehicle 200 based on average ride height only in response to the rate valves 147-150 being closed below a threshold amount of time (e.g., the rate valves 147-150 are open more of the time than closed).

In one or more embodiments, the leveling system 100 is configured to improve the handling of the vehicle 200 by adjusting the duty cycle (DC) of one or more of the rate valves 147-150 in response to parameters associated with the roll, pitch, yaw, and/or height of the vehicle 200, which may be affected by driver inputs and/or road inputs. The DC is the ratio of the time that the rate valve 147-150 is open to the time that the rate valve 147-150 is closed (e.g., the DC is the percentage of time that the rate valve 147-150 is open). Adjusting the DC of the rate valve 147-150 adjusts the amount of time that the secondary volumes 143-146 are in selective communication with the one or more struts 101-104 in the corners of the leveling system 100, which varies at least one of the damping or the spring rate of the leveling system 100 between minimum and maximum attainable values. In one or more embodiments, the instructions stored in the non-volatile memory device 111 of the master controller 109, when executed by the processor 112, cause the master controller 109 adjust the DC of at least one rate valve 147-150 based on a position value associated with the roll, pitch, yaw, and/or height of the vehicle 200, a velocity value associated with the roll, pitch, yaw, and/or height of the vehicle 200, and a direction (i.e., a sense) of the position value and/or the velocity value. In one or more embodiments, the processor 113 of the master controller 109 is configured to calculate or determine the yaw of the vehicle 200 based on the output signal from the steering position sensor 122, and the processor 112 of the master controller 109 is configured to calculate or determine the roll and the pitch of the vehicle 200 based on the output signals from two or more of the height sensors 113-116. In one or more embodiments, the processor 112 of the master controller 109 may be configured to calculate or determine the pitch of the vehicle 200 based on the output signals from a first pair of the height sensors 113-116 and to calculate or determine the roll of the vehicle 200 based on the output signals from a second pair of the height sensors 113-116. In one or more embodiments, the height sensors 113-116 in the first pair of height sensors utilized to determine the pitch of the vehicle 200 may be different than the height sensors 113-116 in the second pair of height sensors utilized to determine the roll of the vehicle 200, or the first and second pairs of height sensors 113-116 may share one height sensor (e.g., the roll and the pitch of the vehicle 200 may be determined from the output signals of four height sensors or three height sensors). In one or more embodiments, the master controller 109 may calculate or determine at least one of roll, pitch, or yaw of the vehicle 200 from the output(s) of one or more of the acceleration sensors 110(1) and/or 110(2). In one or more embodiments, the instructions stored in the memory device 112, when executed by the processor 112, cause the leveling system 100 to adjust the DC of at least one of the rate valves 147-150 further based on the speed of the vehicle 200 (as measured or determined by the vehicle speed sensor 122) and/or the braking of the vehicle 200. In one or more embodiments, the instructions stored in the memory device 112, when executed by the processor 112, cause the leveling system 100 to adjust the DC of at least one of the rate valves 147-150 non-linearly and/or asymmetrically (e.g., the DC of the one or more rate valves 147-150 may be adjusted differently when the roll, pitch, yaw, or height of the vehicle 200 increases compared to when the roll, pitch, yaw, or height of the vehicle 200 decreases). In one or more embodiments, the memory device 112 of the master controller 109 may store a reference table and/or a formula utilized by the master controller 109 to adjust the DC of one or more of the rate valves 147-150. The rate valves 147-150 may be any suitable type or kind of valve that is able to place the secondary volumes 143-146 in selective communication with the corners (e.g., the struts 101-104). For example, in one or more embodiments, the rate valves 147-150 may be binary on/off valves (e.g., poppet style valves) that may be in either a fully closed position or a fully open position only, or the rate valves 147-150 may be proportional style valves that are configured to move into a number of intermediate positions between a fully open position and a fully closed position based on the voltage supplied to the proportional style valve. In one or more embodiments in which the rate valves 147-150 are proportional valves, the leveling system 100 may be configured to adjust the proportionality of the rate valves 147-150 (i.e., the extent to which the rate valves 147-150 are partially open) based on the roll, pitch, yaw, and/or height of the vehicle 200, the speed of the vehicle 200, and/or the braking of the vehicle 200 instead of, or in addition to, adjusting the DC of the rate valves 147-150.

Figure 3:
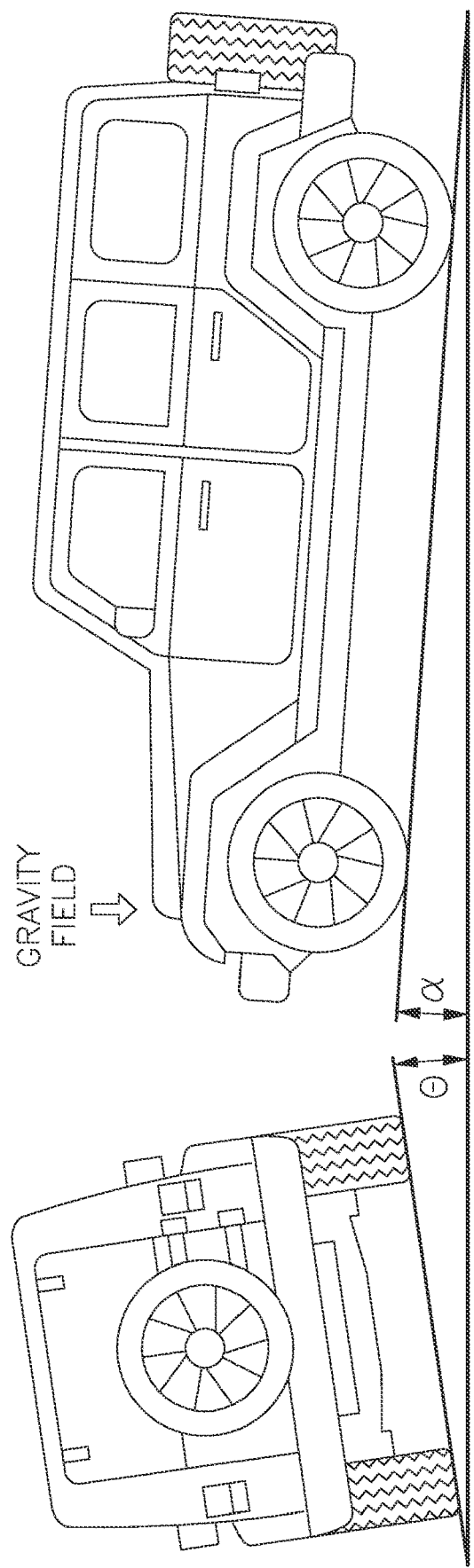
FIG. 3 depicts the roll angle and the pitch angle of an unleveled vehicle.

In the third leveling mode (i.e., true Earth or campsite leveling), the master controller 109 receives the electronic signal from the internal acceleration sensor 110(1) and/or the external acceleration sensors 110(2) that indicate the roll angle θ and the pitch angle α of the vehicle 200, as depicted in FIG. 3. Additionally, in one or more embodiments, the non-volatile memory device 111 of the master controller 109 contains a targeted angle of the vehicle 100 (i.e., a desired angle of the vehicle 100). The targeted angle may be a targeted roll angle and/or a targeted pitch angle of the vehicle 100. The targeted angle may be fixed or adjustable (e.g., via an input or selection on the user interface device 207). In response to the output signals from the acceleration sensor 110(1) and/or the acceleration sensor 110(2) indicating that the roll angle θ and/or the pitch angle α of the vehicle 200 is outside of a first threshold angle (e.g., approximately ±0.5 degrees, approximately ±0.4 degrees, approximately ±0.3 degrees, or approximately ±0.2 degrees) about the targeted angle, the instructions stored in the non-volatile memory device 111 of the master controller 109, when executed by the processor 112, cause the master controller 109 to calculate or determine which of the corners (e.g., the struts 101-104) need to be raised, lowered, or remain at their current height to change (e.g., reduce) the roll angle θ and/or the pitch angle α of the vehicle 200 to be inside the first threshold angle about the targeted angle and thus achieve true earth leveling (or substantially true earth leveling) of the vehicle 200. That is, in response to the roll angle θ and/or the pitch angle α of the vehicle 100 being greater than the targeted angle plus the threshold angle, or the roll angle θ and/or the pitch angle α of the vehicle 200 being less than the targeted angle minus the threshold angle, the instructions stored in the non-volatile memory device 111 of the master controller 109, when executed by the processor 112, cause the master controller 109 to calculate or determine which of the corners (e.g., the struts 101-104) need to be raised, lowered, or remain at their current height to change (e.g., reduce) the roll angle θ and/or the pitch angle α of the vehicle 200 to be inside the first threshold angle about the targeted angle and thus achieve true earth leveling (or substantially true earth leveling) of the vehicle 200.

In one or more embodiments, the floor of the vehicle 200 may have a non-zero pitch angle and/or a non-zero roll angle when the vehicle 200 is operating on flat, level ground. For instance, in one or more embodiments the vehicle 200 may be raked (e.g., the vehicle 200 may have a nose-down pitch of, for instance, approximately 3 degrees). In one or more embodiments, the targeted angle stored in the non-volatile memory device 111 may be equal to (or substantially equal to) the opposite of the inherent pitch and/or the inherent roll of the vehicle 100. For instance, in an embodiment in which the floor plane of the vehicle 100 is inherently raked downward at −3.0 degrees when the vehicle 200 is operating on level ground, the targeted angle stored in the non-volatile memory device 111 may be +3.0 degrees such that the ground plane of the vehicle 100 is perpendicular (or substantially perpendicular) to the gravitational field following operation of the true Earth leveling mode. Additionally, during the task of calculating or determining which of the corners (e.g., the struts 101-104) need to be raised, lowered, or remain at their current height to change (e.g., reduce) the roll angle θ and the pitch angle α of the vehicle 200 to be inside the threshold angle about the targeted angle, the master controller 109 is configured to ensure that no corner (e.g., no strut 101-104) is lowered below a minimum position (e.g., maximum insertion of the piston 107 and the connecting rod 108 inside the cylinder 105) or raised above a maximum position (e.g., maximum extension of the connecting rod 108 outside of the cylinder 105). In the third leveling mode (i.e., true Earth leveling), the master controller 109 is configured to raise and lower the corners (e.g., the struts 101-104) in the same manner as that described above regarding the first leveling mode.

In one or more embodiments, in response to at least one of the roll angle θ or the pitch angle α of the vehicle 200 being between the first threshold angle and a second threshold angle greater than the first threshold angle about the targeted angle (i.e., the roll angle θ and/or the pitch angle α of the vehicle 200 being outside the first threshold angle about the targeted angle, but inside a second threshold angle about the targeted angle), the computer-readable instructions, when executed by the processor 112, cause the master controller 109 to individually raise at least one of the corners (e.g., the struts 101-104) (by activating the pump 125 and opening corresponding isolation valve(s) 127-130 to deliver the volume of the compressible liquid L to the corners (e.g., the strut(s) 101-104)) and/or individually lower at least one of the corners (e.g., the struts 101-104) by opening the one dump valve 126 and opening corresponding isolation valve(s) 127-130 to withdraw a volume of the compressible liquid L from the corners (e.g., the struts 101-104) to change (e.g., reduce) the roll angle θ and/or the pitch angle α to be inside the first threshold angle about the targeted angle. That is, in one or more embodiments, if the roll angle θ and/or the pitch angle α of the vehicle 200 are sufficiently close to zero or sufficiently close to the first threshold angle about the targeted angle (i.e., the vehicle 200 is close to true Earth level before performing the leveling operation), the leveling system 100 is configured to raise and/or lower one or more of the corners (e.g., the struts 101-104) individually.

In one or more embodiments, in response to at least one of the roll angle θ or the pitch angle α of the vehicle 200 being outside the second threshold angle about the targeted angle (i.e., the roll angle θ and/or the pitch angle α of the vehicle 200 being outside both the first threshold angle and the second threshold angle about the targeted angle), the computer-readable instructions, when executed by the processor 112, cause the master controller 109 to raise at least a pair of the corners (e.g., the struts 101-104) (by activating the pump 126 and opening at least a corresponding pair of the isolation valves 127-130 to deliver the volume of the compressible liquid L to the pair of corners (e.g., the struts 101-104)) and/or lower at least a pair of the corners (e.g., the struts 101-104) (by opening the dump valve 126 and opening at least a corresponding pair of the isolation valves 127-130 to withdraw a volume of the compressible liquid L from the pair of corners (e.g., the struts 101-104)) to change (e.g., reduce) the roll angle θ and the pitch angle α to be inside the second threshold angle. That is, in one or more embodiments, if the roll angle θ and/or the pitch angle α of the vehicle 200 are sufficiently unlevel before performing the leveling operation, the leveling system 100 is configured to raise and/or lower the corners (e.g., the struts 101-104) in pairs, rather than individually. Once the roll angle θ and the pitch angle α of the vehicle 200 are inside the second threshold angle about the targeted angle, the computer-readable instructions, when executed by the processor 113, cause the master controller 109 to individually raise and/or lower the corners (e.g., the struts 101-104) as described above until the roll angle θ and the pitch angle α of the vehicle 200 are inside the first threshold angle about the targeted angle.

In one or more embodiments, the computer-readable instructions, when executed by the processor 112, cause the master controller 109 to raise the at least one of the corners (e.g., the struts 101-104) and/or lower the at least one of the corners (e.g., the struts 101-104) to preferentially change (e.g., reduce) the pitch angle α over the roll angle θ of the vehicle 200 (e.g., a bias factor is supplied by the computer-readable instructions to preferentially change (e.g., reduce) the pitch angle α over the roll angle θ of the vehicle 200). In general, preferentially changing (e.g., reducing) the pitch angle α over the roll angle θ achieves true Earth leveling faster than not preferentially changing (e.g., reducing) the pitch angle α over the roll angle θ. However, in one or more embodiments, the computer-readable instructions may not be configured to preferentially change (e.g., reduce) the pitch angle α over the roll angle θ of the vehicle 200.

Additionally, in the third leveling mode (i.e., true Earth leveling), the instructions stored in the non-volatile memory device 111 of the master controller 109, when executed by the processor 112, cause the master controller 109 to send signals (e.g., wirelessly or via the wires 151-154) to completely close all of the rate valves 147-150 after the vehicle 200 has been leveled to true Earth in the manner described above. Closing the rate valves 147-150 reduces the effective volume of the compressible liquid L in the corners (e.g., the struts 101-104) by separating the corners (e.g., the struts 101-104) from the secondary volumes 143-146, which increases the spring rate of the corners (e.g., the struts 101-104) and thereby makes the vehicle 200 a more stable platform and thus increases user comfort while camping in the vehicle 200. Closing the rate valves 147-150 also reduces contraction of the corners (e.g., the struts 101-104) due to the contraction of the compressible liquid L that occurs due to temperature decrease that typically occurs overnight.

Furthermore, the instructions stored in the non-volatile memory device 111 of the master controller 109, when executed by the processor 112, cause the master controller 109 to automatically disengage the third leveling mode in response to the master controller 109 receiving a signal from the vehicle speed sensor 122 indicating that that vehicle 200 is moving. In this manner, the leveling system 100 is configured to disengage the true Earth leveling mode if the user forgets or neglects to disengage the true Earth leveling mode before driving away.

In one or more embodiments, the leveling system 100 is configured to apply an offset angle such that the floor of the vehicle 200 is pitched and/or rolled with respect to true Earth after operation of the third leveling mode (i.e., true Earth leveling). The offset angle may be a roll offset angle and/or a pitch offset angle. Applying an angular offset may be useful, for instance, in satellite communication vehicles that must orient a receiver/transmitter toward a satellite or in a military vehicle that must orient ordinance toward a target in the battlefield. In one or more embodiments, the targeted angle stored in the non-volatile memory device 111 may include the inherent pitch and/or roll of the vehicle 100 (if any) plus the offset angle (e.g., the targeted angle may be the inherent pitch of the vehicle 100 plus a pitch offset angle, and/or the targeted angle may be the inherent roll of the vehicle 100 plus a roll offset angle). The offset angle may be fixed or adjustable (e.g., via an input or selection on the user interface device 207). In one or more embodiments, In response to the output signals from the acceleration sensor 110(1) and/or the acceleration sensor 110(2) indicating that the roll angle θ and/or the pitch angle α of the vehicle 200 is outside of a first threshold angle about the targeted angle, the instructions stored in the non-volatile memory device 111 of the master controller 109, when executed by the processor 112, cause the master controller 109 to calculate or determine which of corners (e.g., the struts 101-104) need to be raised, lowered, or remain at their current height to change (e.g., reduce) the roll angle θ and/or the pitch angle α of the vehicle 200 to be inside the first threshold angle about the targeted angle and thus achieve the desired offset roll and/or the desired offset pitch of the vehicle 200. Following the calculation or determination of the corner(s) (e.g., the strut(s) 101-104) that need to be raised, lowered, or remain at their current height, the computer-readable instructions, when executed by the processor 112, cause the master controller 109 to raise at least one of the corners (e.g., the struts 101-104) (by activating the pump 125 and opening corresponding isolation valve(s) 127-130 to deliver the volume of the compressible liquid L to the corners (e.g., the strut(s) 101-104)) and/or lower at least one of the corners (e.g., the struts 101-104) (by opening the one dump valve 126 and opening corresponding isolation valve(s) 127-130 to withdraw a volume of the compressible liquid L from the corners (e.g., the struts 101-104)) to change (e.g., reduce or increase) the roll angle θ and/or the pitch angle α to be inside the first threshold angle about the targeted angle and thus achieve the desired offset roll angle and/or the desired offset pitch angle of the vehicle 200.

In one or more embodiments, the leveling system 100 is also configured to achieve one or more alternate ride heights of the vehicle 200, such as when the vehicle 200 is traveling at a speed below a threshold speed (e.g., 15 miles per hour (mph), 10 mph, or mph). For example, in one or more embodiments, the master controller 109 receives the electronic signal from vehicle speed sensor 122 that indicates the speed of the vehicle 200 and the electronic signals from the height sensors 113-116 that indicate the relative heights of each of the corners (e.g., the struts 101-104). In response to the speed of the vehicle 200 being below the threshold speed and a user selection, the instructions stored in the non-volatile memory device 111 of the master controller 109, when executed by the processor 112, cause the master controller 109 to calculate or determine which of the corners (e.g., the struts 101-104) need to be raised, lowered, or remain at their current height to achieve a desired ride height configuration corresponding to the user selection, which may include: (i) raised height rear struts 103, 104 and normal ride height front struts 101, 102; (ii) raised height front struts 101, 102 and normal ride height rear struts 103, 104; (iii) raised height front and rear struts 101, 102, 103, 104; (iv) lowered height front struts 101, 102 and normal ride height rear struts 103, 104; (v) lowered height rear struts 103, 104 and normal ride height front struts 101, 102; (vi) lowered height front and rear struts 101, 102, 103, 104; (vii) raised height front struts 101, 102 and lowered height rear struts 103, 104; or (viii) lowered height front struts 101, 102 and raised height rear struts 103, 104. In one or more embodiments, the desired ride height may be selected or indicated in any suitable manner, such as, for instance, in response to a user selection on the user interface device 207 and/or in response to an external signal not from the user interface device 207 (e.g., a signal from one or more door switches in the vehicle 200). In response to the master controller 109 determining that one or more of the struts 101-104 need to be raised to achieve the user-selected ride height configuration, the instructions stored in the non-volatile memory device 111 of the master controller 109, when executed by the processor 112, cause the master controller 109 to send a control signal, wirelessly or via wire 131, to activate the pump/motor 125 and to send control signals, wireless or via one or more of the wires 133-136, to open the isolation valves 127-130 associated with the struts 101-104 that need to be raised. When the pump/motor 125 is activated and one or more of the isolation valves 127-130 are open, compressible liquid L flows from the reservoir 124, through the pump/motor 125, and through the one or more open isolation valves 127-130 into the one or more secondary volumes 143-146 associated with the open isolation valve(s) 127-130. In response to the master controller 109 determining that one or more of the struts 101-104 need to be lowered to achieve the user-selected ride configuration, the instructions stored in the non-volatile memory device 111 of the master controller 109, when executed by the processor 112, cause the master controller 109 to send a control signal, wirelessly or via wire 132, to open the dump valve 126 and to send control signals, wirelessly or via wire(s) 133-136, to open the isolation valve(s) 127-130 associated with the struts 101-104 that need to be lowered. When the dump valve 126 and the one or more of the isolation valves 127-130 are open, compressible liquid L flows from the strut(s) 101-104 that need to be lowered into the associated auxiliary volumes 155-158 and the associated secondary volumes 143-146 (or, if the auxiliary volumes 152-155 are not provided, into the secondary volumes 143-146 only). The compressible liquid L that flows into the secondary volumes 143-146 displaces the compressible liquid L present in the secondary volumes 143-146 and causes the displaced volume of compressible liquid L to flow into the reservoir 124.

Furthermore, in one or more embodiments, the leveling system 100 is configured to decrease the ride height of the vehicle 200 when it is traveling at a speed above a threshold speed (e.g., freeway speed, such as approximately 45 mph, 55 mph, or 65 mph) to reduce frontal drag and improve the fuel economy of the vehicle 200. In one embodiment, the leveling system 100 may be configured to automatically decrease the ride height of the vehicle 200 when the vehicle 200 is traveling at a speed above the threshold speed. In another embodiment, the leveling system 100 may be configured to decrease the ride height of the vehicle 200 in response to a user selection (e.g., via an icon on a user interface inside of the vehicle 200) and the vehicle 200 is traveling at a speed above the threshold speed. The ride height of the vehicle 200 utilized to reduce the frontal drag and improve fuel economy may be the first low height setting or the second low height setting referenced above.

In one or more embodiments, the leveling system 100 is configured to increase the ride height of the vehicle 200 to increase the ground clearance of the vehicle 200, which may be useful when the vehicle 200 is operating offroad. In one or more embodiments, the leveling system 100 may be configured to increase the ride height of the vehicle 200 in response to a user selection (e.g., via a switch, a button, or an icon on a user interface inside of the vehicle 200). Additionally, in one or more embodiments, the leveling system 100 may be configured to increase the ride height of the vehicle 200 only when the vehicle 200 is traveling at or below a maximum speed (e.g., the vehicle 200 is traveling at speed below the maximum speed that is safe for offroad travel, such as 40 mph, which may vary for different types of vehicles or vehicles having different configurations). The ride height of the vehicle 200 during off-roading may be the first high height setting or the second high height setting referenced above.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is referred to as being "coupled" or "connected" to another component, it can be directly attached to the other component or intervening components may be present therebetween.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

What is claimed is:

1. A closed leveling system for a vehicle, the closed leveling system comprising:
    a suspension system having a plurality of corners, wherein each corner of the plurality of corners of the suspension system comprises at least one strut of a plurality of struts configured to be coupled to at least one wheel of a plurality of wheels of the vehicle;
    at least one sensor;
    a master controller in communication with the at least one sensor, the master controller comprising:
        a non-volatile memory device comprising computer-readable instructions; and
        a processor in communication with the non-volatile memory device;
    a power module assembly comprising:
        a reservoir containing a compressible liquid;
        a pump configured to withdraw a volume of the compressible liquid from the reservoir;
        at least one dump valve configured to transfer a volume of the compressible liquid into the reservoir, wherein a number of the at least one dump valve is less than a number of the plurality of corners of the suspension system; and
        a plurality of isolation valves, each isolation valve of the plurality of isolation valves being associated with at least one corner of the plurality of corners; and
    a plurality of secondary volumes in selective fluid communication with the reservoir, each secondary volume of the plurality of secondary volumes being associated with one isolation valve of the plurality of isolation valves and at least one corner of the plurality of corners.

2. The closed leveling system of claim 1, further comprising at least one flow restrictor between at least one secondary volume of the plurality of secondary volumes and the reservoir.

3. The closed leveling system of claim 2, wherein the at least one flow restrictor is an asymmetric bi-directional flow restrictor.

4. The closed leveling system of claim 1, wherein the at least one dump valve is a single dump valve.

5. The closed leveling system of claim 1, further comprising a plurality of rate valves, each rate valve of the plurality of rate valves being associated with one secondary volume of the plurality of secondary volumes, and wherein the plurality of rate valves are configured to move between an open configuration in which the plurality of secondary volumes are in fluid communication with the plurality of corners and a closed configuration in which the plurality of secondary volumes are isolated from the plurality of corners.

6. The closed leveling system of claim 5, further comprising a plurality of auxiliary volumes in fluid communication with the plurality of secondary volumes, wherein each rate valve of the plurality of rate valves separates one auxiliary volume of the plurality of auxiliary volumes from a respective secondary volume of the plurality of secondary volumes.

7. The closed leveling system of claim 1, wherein the at least one sensor comprises a first acceleration sensor and a second acceleration sensor.

8. The closed leveling system of claim 1, further comprising a vehicle speed sensor in communication with the master controller.

9. The closed leveling system of claim 1, further comprising a plurality of height sensors, each height sensor of the plurality of height sensors being associated with one corner of the plurality of corners of the vehicle.

10. The closed leveling system of claim 1, further comprising a steering position sensor in communication with the master controller.

11. A closed leveling system for a vehicle, the closed leveling system comprising:
    a suspension system having a plurality of corners, wherein each corner of the plurality of corners of the suspension system comprises at least one strut of a plurality of struts configured to be coupled to at least one wheel of a plurality of wheels of the vehicle;
    at least one sensor configured to measure a roll angle and a pitch angle of the vehicle;
    a master controller in communication with the at least one sensor, the master controller comprising:
        a non-volatile memory device comprising computer-readable instructions containing a targeted angle for at least one of the roll angle or the pitch angle of the vehicle; and
        a processor in communication with the non-volatile memory device;
    a power module assembly comprising:
        a reservoir containing a compressible liquid;
        a pump configured to withdraw a volume of the compressible liquid from the reservoir;
        at least one dump valve configured to transfer a volume of the compressible liquid into the reservoir; and
        a plurality of isolation valves, each isolation valve of the plurality of isolation valves being associated with at least one corner of the plurality of corners; and
    a plurality of secondary volumes in selective fluid communication with the reservoir, each secondary volume of the plurality of secondary volumes being associated with one isolation valve of the plurality of isolation valves and at least one corner of the plurality of corners,
    wherein, in response to at least one of the roll angle or the pitch angle of the vehicle being outside a first threshold angle about the targeted angle, the computer-readable instructions, when executed by the processor, cause the master controller to:
        raise at least one corner of the plurality of corners by activating the pump and opening at least one isolation valve of the plurality of isolation valves to deliver the volume of the compressible liquid to the at least one corner of the plurality of corners; and/or
        lower at least one corner of the plurality of corners by opening the at least one dump valve and opening at least one isolation valve of the plurality of isolation valves to withdraw a volume of the compressible liquid from the at least one corner of the plurality of corners to change the at least one of the roll angle or the pitch angle to be inside the first threshold angle about the targeted angle.

12. The closed leveling system of claim 11, wherein each isolator valve of the plurality of isolator valves is associated with one corner of the plurality of corners of the suspension system.

13. The closed leveling system of claim 11, wherein one isolator valve of the plurality of isolator valves is associated with two corners of the plurality of corners of the suspension system.

14. The closed leveling system of claim 11, wherein the at least one sensor is selected from the group consisting of an accelerometer, a gyroscope, an inclinometer, a pair of height sensors, and an inertial measurement unit (IMU).

15. The closed leveling system of claim 11, wherein, in response to at least one of the roll angle or the pitch angle of the vehicle being outside a second threshold angle about the targeted angle, the second threshold angle being greater than the first threshold angle, the computer-readable instructions, when executed by the processor, cause the master controller to:
- raise at least a first pair of the plurality of corners by activating the pump and opening at least a first pair of the plurality of isolation valves to deliver the volume of the compressible liquid to the at least first pair of the plurality of corners; and/or
- lower at least a second pair of the plurality of corners by opening the at least one dump valve and opening at least a second pair of the plurality of isolation valves to withdraw a volume of the compressible liquid from the at least second pair of the plurality of corners to change the at least one of the roll angle or the pitch angle to be inside the second threshold angle about the targeted angle.

16. The closed leveling system of claim 11, wherein, in response to the at least one of the roll angle or the pitch angle of the vehicle being inside the first threshold angle about the targeted angle, the computer-readable instructions, when executed by the processor, further cause the master controller to close a plurality of rate valves separating the plurality of secondary volumes from the plurality of corners.

17. The closed leveling system of claim 11, wherein the computer-readable instructions, when executed by the processor, cause the master controller to:
- raise the at least one of the plurality of corners and/or lower the at least one of the plurality of corners to preferentially change the pitch angle over the roll angle of the vehicle.

18. A vehicle comprising:
- a cab on a frame, or a unibody;
- a plurality of wheels;
- a steering device operably coupled to at least one wheel of the plurality of wheels;
- a user interface; and
- a closed leveling system comprising:
  - a suspension system having a plurality of corners, wherein each corner of the plurality of corners of the suspension system comprises at least one strut of a plurality of struts coupling at least one wheel of the plurality of wheels to the frame or the unibody;
  - at least one sensor selected from the group consisting of a plurality of height sensors, a steering sensor, and at least one acceleration sensor;
  - a master controller in communication with the at least one sensor, the master controller comprising:
    - a non-volatile memory device comprising computer-readable instructions; and
    - a processor in communication with the non-volatile memory device;
  - a power module assembly comprising:
    - a reservoir containing a compressible liquid;
    - a pump configured to withdraw a volume of the compressible liquid from the reservoir;
    - at least one dump valve configured to transfer a volume of the compressible liquid into the reservoir; and
    - a plurality of isolation valves, each isolation valve of the plurality of isolation valves being associated with at least one corner of the plurality of corners; and
  - a plurality of secondary volumes in selective fluid communication with the reservoir, each secondary volume of the plurality of secondary volumes being associated with one isolation valve of the plurality of isolation valves and at least one corner of the plurality of corners,
  - wherein the instructions stored in the memory device, when executed by the processor, cause the closed leveling system to auto-calibrate the at least one sensor in response to an input on the user interface, and
  - wherein the instructions stored in the memory device, when executed by the processor, further cause the closed leveling system to display an error on the user interface in response to any one of the at least one sensor outputting a signal outside of a normal operating range or that deviates beyond a threshold deviation from an expected value.

19. The vehicle of claim 18, wherein the at least one sensor comprises the plurality of height sensors, and wherein the instructions stored in the memory device, when executed by the processor, further cause the master controller to:
- determine a first signal output by a first height sensor of the plurality of height sensors associated with a first corner of the plurality of corners;
- send a command to raise the first corner from a first height to second height by activating the pump and opening a first isolation valve of the plurality of isolation valves to deliver the volume of the compressible liquid to the first corner;
- determine a second signal output by the first height sensor after the command; and
- display an error on the user interface in response to a difference between the second signal and the first signal being below a minimum threshold or the difference having a sign opposite to an expected sign.

20. The vehicle of claim 18, wherein the at least one sensor comprises the at least one acceleration sensor, and wherein the instructions stored in the memory device, when executed by the processor, further cause the master controller to:
- record a first axis output value, a second axis output value, and a third axis output value of the at least one acceleration sensor; and
- set a maximum of the first axis output value, the second axis output value, and third axis output value as a heave axis of the at least one acceleration sensor.

21. The vehicle of claim 20, wherein the instructions stored in the memory device, when executed by the processor, further cause the master controller to:
- raise or lower front corners or rear corners of the plurality of corners by activating the pump or opening the at least one dump valve, and opening two of the plurality of isolation valves to deliver the volume of the compressible liquid to or from the front corners or the rear corners;
- record the first axis output value, the second axis output value, and the third axis output value of the at least one acceleration sensor;
- set as a pitch axis of the acceleration sensor the first axis output value, the second axis output value, or the third axis output value that changed the most from raising or lowering the front corners or the rear corners; and
- set a remaining one of the first axis output value, the second axis output value, and the third axis output value as a roll axis of the acceleration sensor.

22. The vehicle of claim 21, wherein the instructions stored in the memory device, when executed by the processor, further cause the master controller to:
raise each corner of the plurality of corners to a maximum position;
determine maximum output values of the plurality of height sensors at the maximum position;
lower each corner of the plurality of corners to a minimum position;
determine minimum output values of the plurality of height sensors at the minimum position;
set at least one high height setting of the vehicle based on positions of the plurality of corners corresponding to a first percentage of the maximum output values;
set at least one low height setting of the vehicle based on positions of the plurality of corners corresponding to a second percentage of the minimum output values; and
set a normal height setting of the vehicle based on positions of the plurality of corners corresponding to intermediate output values of the plurality of height sensors between the maximum output values and the minimum output values.

23. The vehicle of claim 22, wherein the instructions stored in the memory device, when executed by the processor, further cause the master controller to:
move the plurality of corners to the normal height setting; and
apply an offset to make an output of the heave axis of the at least one acceleration sensor equal to 1.0 g and outputs of the pitch axis and the roll axis of the at least one acceleration sensor both equal to 0.0 g.

24. The vehicle of claim 18, wherein the at least one sensor comprises the plurality of height sensors, and wherein the instructions stored in the memory device, when executed by the processor, further cause the master controller to:
determine an initial output from each height sensor of the plurality of height sensors;
raise or lower one corner of the plurality of corners;
determine a final output from each height sensor of the plurality of height sensors after the one corner has been raised or lowered; and
display an error on the user interface in response to a height sensor of the plurality of height sensors having a largest change between the initial output and the final output not being associated with the one corner that was raised or lowered.

25. The vehicle of claim 18, wherein the instructions stored in the memory device, when executed by the processor, cause the closed leveling system to:
determine a weight imbalance on a front axle of the vehicle; and
adjust heights of the plurality of corners to shift weight to one corner of a rear axle of the vehicle and to reduce the weight imbalance on the front axle.

26. A vehicle comprising:
a cab on a frame, or a unibody;
a plurality of wheels;
a steering device operably coupled to at least one wheel of the plurality of wheels; and
a closed leveling system comprising:
a suspension system having a plurality of corners, wherein each corner of the plurality of corners of the suspension system comprises at least one strut of a plurality of struts coupling at least one wheel of the plurality of wheels to the frame or the unibody;
at least one sensor configured to measure a parameter related to at least one of a roll of the vehicle, a pitch of the vehicle, a yaw of the vehicle, or a height of the vehicle;
a master controller in communication with the at least one sensor, the master controller comprising:
a non-volatile memory device comprising computer-readable instructions; and
a processor in communication with the non-volatile memory device;
a reservoir containing a compressible liquid;
a plurality of isolation valves, each isolation valve of the plurality of isolation valves being associated with at least one corner of the plurality of corners;
a plurality of secondary volumes in selective fluid communication with the reservoir, each secondary volume of the plurality of secondary volumes being associated with one isolation valve of the plurality of isolation valves and at least one corner of the plurality of corners;
a plurality of rate valves, each rate valve of the plurality of rate valves being associated with one secondary volume of the plurality of secondary volumes, and wherein the plurality of rate valves are configured to move between an open configuration in which the plurality of secondary volumes are in fluid communication with the plurality of corners and a closed configuration in which the plurality of secondary volumes are isolated from the plurality of corners; and
a pump configured to withdraw a volume of the compressible liquid from the reservoir;
wherein the instructions stored in the memory device, when executed by the processor, cause the closed leveling system to:
adjust a duty cycle (DC) and/or a proportionality of at least one rate valve of the plurality of rate valves based on a position value, a velocity value, and a direction of at least one of the position value or the velocity value associated with at least one of the roll of the vehicle, the pitch of the vehicle, the yaw of the vehicle, or the height of the vehicle.

27. The vehicle of claim 26, wherein the at least one sensor comprises:
an accelerometer configured to measure the roll of the vehicle, the pitch of the vehicle, and the yaw of the vehicle; or
a steering position sensor configured to measure the yaw of the vehicle;
a first pair of height sensors configured to measure the roll of the vehicle; and
a second pair of height sensors configured to measure the pitch of the vehicle.

28. The vehicle of claim 26, wherein the instructions stored in the memory device, when executed by the processor, cause the closed leveling system to adjust the DC and/or the proportionality of the at least one rate valve further based on at least one of a speed of the vehicle or braking of the vehicle.

29. The vehicle of claim 26, wherein the instructions stored in the memory device, when executed by the processor, cause the closed leveling system to adjust the DC and/or the proportionality of the at least one rate valve non-linearly and/or asymmetrically.

30. The vehicle of claim 26, wherein the instructions stored in the memory device, when executed by the processor, cause the closed leveling system to adjust the DC and/or the proportionality of the at least one rate valve with reference to a lookup table or a formula.

* * * * *